United States Patent [19]
Maitland

[11] Patent Number: 6,038,806
[45] Date of Patent: Mar. 21, 2000

[54] FISH HOOK WITH BAIT HOLDER

[76] Inventor: Gregory Maitland, 21 Rowland St., Marblehead, Mass. 01945

[21] Appl. No.: 09/136,777

[22] Filed: Aug. 19, 1998

[51] Int. Cl.⁷ .......................... A01K 69/00; A01K 83/06; A01K 83/00
[52] U.S. Cl. ................. 43/4.5; 43/44.8; 43/44.2; 43/43.16
[58] Field of Search .................. 43/43.16, 44.2, 43/44.8, 4.5

[56] References Cited

U.S. PATENT DOCUMENTS

| | | | |
|---|---|---|---|
| 70,913 | 11/1867 | Sterling | 43/44.8 |
| 1,249,342 | 12/1917 | Dahl | 43/44.8 |
| 1,325,530 | 12/1919 | Ore | 43/44.2 |
| 1,791,723 | 2/1931 | Hampton | 43/44.8 |
| 1,863,544 | 6/1932 | Prouse | 43/44.8 |
| 2,047,676 | 7/1936 | Edmondson | 43/44.2 |
| 2,503,573 | 4/1950 | Allen | 43/44.8 |
| 2,573,018 | 10/1951 | Herrick | 43/44.8 |
| 2,825,174 | 3/1958 | Leinonen | 43/44.8 |
| 3,061,968 | 11/1962 | Stroud | 43/44.8 |
| 3,333,359 | 8/1967 | Barker, Jr. | 43/43.6 |
| 3,359,675 | 12/1967 | Call | 43/44.8 |
| 3,435,553 | 4/1969 | Conley | 43/44.8 |
| 3,494,066 | 2/1970 | Lawter | 43/44.8 |
| 3,834,060 | 9/1974 | Wagenknecht | 43/44.8 |
| 4,251,942 | 2/1981 | Jacobus | 43/44.8 |
| 4,688,347 | 8/1987 | Krogmann | 43/44.8 |
| 4,738,048 | 4/1988 | Junkas | 43/44.2 |
| 4,785,571 | 11/1988 | Beck | 43/44.4 |
| 5,386,661 | 2/1995 | Davis | 43/44.8 |

FOREIGN PATENT DOCUMENTS

| | | | |
|---|---|---|---|
| 533620 | 11/1956 | Canada | 43/44.8 |
| 647358 | 12/1950 | United Kingdom | 43/44.2 |
| 973689 | 10/1964 | United Kingdom | 43/44.8 |

*Primary Examiner*—Michael J. Carone
*Assistant Examiner*—Fredrick T. French, III
*Attorney, Agent, or Firm*—Joseph R. Birkner

[57] ABSTRACT

A fish hook with bait holder for receiving and holding a live bait fish, the fish hook comprising a fish hook having an eye on one end for attaching a line, a shank terminating in a bend with a barb on a second end and a rod attached to the fish hook. The rod having a bent portion with a first end and a linearly straight portion with a pointed portion on a second free end, for receiving the live bait fish and barbs for holding the live bait fish. The fish hook with bait holder is adaptable to being selectively mountable on various body locations of the live bait fish, as well as being usable with other types of natural and artificial baits.

18 Claims, 3 Drawing Sheets

FISH HOOK WITH BAIT HOLDER

FIELD OF THE INVENTION

This invention relates generally to fishing devices such as fish hooks. More particularly, the present invention relates to a fish hook with a bait holder. The bait holder attached to the fish hook is in the form of a rod, being insertable under the skin into the tissue of a live bait fish, having first retainer means for receiving the live bait fish and second retainer means for holding the live bait fish on the fish hook without causing serious injury to the live bait fish or impairing the natural swimming action of the live bait fish.

BACKGROUND OF THE INVENTION

It was recognized by the present inventor while fishing, that live bait fish when attached by a barb of a conventional fish hook, more often than not, are killed unintentionally by the piercing wound caused by the barb. Furthermore, when the live bait fish is placed on the hook, it is typically attached by inserting the barb into a tail, a back or a mouth. Such attachment, impairs swimming, causing the live bait fish to behave in an unnatural manner so that a target fish is less likely to be attracted to the live bait fish resulting in less fishing success and enjoyment of the sport.

Other ways for holding bait on fish books attempted in the past include attachments such as impaling prongs, clips, clasps, pins, elastomeric members, wires, and others. Such devices are inconvenient to use, unreliable, awkward to apply to an active live bait fish and often impede the natural action of the live bait fish. Furthermore, using such devices causes the live bait fish to die or to be lost prematurely due to poor attachment of the live bait fish to the fish hook.

U.S. Pat. No. 2,825,174 to Leinonen shows a fish hook with a live bait holder that has an impaling prong that is an integral extension of one end of the fish hook. A live bait fish is impaled on the impaling prong by inserting the impaling prong into the mouth and into the body and vital organs of the live bait fish. The patent teaches that, in addition to the impaling prong, an anchor hook attached to the shank of the fish hook adjacent the bend is necessary to hold the bait fish on the hook by inserting the barb of the anchor hook into the rear end of the bait fish. Unfortunately, however, the Leinonen device suffers a plurality of disadvantages. For example, it is timely and difficult to mount a live bait fish on the bait holder that is lively and jumping around. Also, since the distance between the pointed free end of the impaling prong and the barb of the anchor hook is fixed, the live bait fish is limited in size to fit between the distances mentioned and the bait holder can not be used with any size live bait fish. Furthermore, even when the live bait fish is successfully mounted on the fish hook, it is unlikely that a live bait fish impaled on the device would remain alive after such severe impalement of body organs. Certainly it would not allow natural swimming, rather it would cause the live bait fish to behave unnaturally and less attractive for catching a target fish. Also, the hook is not concealed nor is it positioned to advantageously reliably hook the target fish when it strikes the live bait fish, rather an additional treble hook is necessary for improved hooking purposes.

U.S. Pat. No. 5,386,661 to Davis shows a live bait fish hook for carrying a live bait fish. A secondary shaft is flexibly interconnected to and extends from the primary shaft of the fish hook and is insertable through the mouth and gill of a live bait fish. A clasp selectively interconnects the primary shaft and a distal point of the secondary shaft to restrict removal of the secondary shaft from the live bait fish. The Davis device has several disadvantages, for example, it certainly would not allow natural swimming, rather it would cause the live bait fish to behave unnaturally and less attractive for catching a target fish. Furthermore, the insertion of the secondary shaft interferes with the natural mouth and gill breathing motion of the live bait fish and it is unlikely that a live bait fish impaled on the device would remain alive for any length of time.

U.S. Pat. No. 4,785,571 to Beck shows a fish hook with live bait holder that uses an elastic strip secured at spaced points to the fish hook and cooperating with the shank to hold live bait such as a minnow. Tension on the bait may be adjusted to keep it on the fish hook by varying the length of the elastic strip. Disadvantages of this device include difficult and insecure attachment of the live bait fish to the fish hook resulting in bait slippage due to inadequate tension adjustment caused by human error when attempting to accommodate live bait fish of varying sizes. Furthermore, elastic degradation over time caused by improper storage, mechanical damage caused by the pointed prongs needed to hold and to adjust the elastic strip, wear and varying environmental operating conditions weaken the elastic strip and contribute to eventual bait loss, particularly during casting.

Accordingly, it becomes clear that there is a great need for a fish hook with a bait holder that receives, holds and secures a live bait fish without causing serious injury to the live bait fish or impairing the natural swimming action of the live bait fish.

SUMMARY OF THE INVENTION

It is therefore an object of this invention to provide a fish hook with bait holder for conveniently receiving and securely holding a live bait fish.

It is also an object of this invention to provide a fish hook with bait holder that does not cause serious injury to the live bait fish or impair the natural swimming action of the live bait fish when in use.

It is also an object of this invention to provide a fish hook with bait holder that is selectively mountable on various body locations of a live bait fish, as well as being usable with other types of natural and artificial baits.

It is a further object of this invention to provide a fish hook with bait holder that is simple in design, simple to manufacture, low in cost and fun and easy to use.

These and other objects are met by the present invention for a fish hook with bait holder that conveniently receives and securely holds a live bait fish without causing serious injury to the live bait fish or impairing the natural swimming action of the live bait fish. In a most basic embodiment, the invention essentially comprises a fish hook in combination with a bait holder.

Stated more particularly, the fish hook with baitholder for receiving and holding a live bait fish, may comprise a fish hook having an eye on one end for attaching a line, a shank terminating in a bend with a barb on a second end and a rod attached to the fish hook. The rod may have a bent portion with a first end and a linearly straight portion with a pointed portion on a second free end, for receiving the live bait fish and barbs for holding the live bait fish.

The most basic embodiment of the invention is rendered more useful when the bent portion of the rod is curved and is contiguous with the return bend of the shank of the fish hook. This allows convenient mounting for receiving the live bait fish on the fish hook with bait holder by selectively inserting the pointed portion of the rod under the skin into the tissue of the live bait fish lengthwise along a dorsal fin when still fishing or centrally lengthwise between the eyes of the live bait fish near a nose of the live bait fish extending in a direction toward an upper mouth portion of the live bait fish, when trolling, without causing serious injury to the live bait fish or impairing the natural swimming action of the live bait fish when in use.

The most basic embodiment of the invention is rendered still more useful when the bent portion of the rod has a 90 degree bend and is disposed on the shank adjacent the return bend of the fish hook. This allows convenient mounting for receiving the live bait fish on the fish hook with bait holder by selectively inserting the pointed portion of the rod under the skin into the tissue of the live bait fish lengthwise along a body portion when fishing without causing serious injury to the live bait fish or impairing the natural swimming action of the live bait fish when in use.

Hence, the instant invention can provide other bait holding options for various live bait, dead bait, or for other animal or vegetable bait attachments.

One skilled in the art will realize that the foregoing discussion broadly outlines the more important features of the invention to enable a better understanding of the detailed description that follows and to instill a better appreciation of the inventor's contribution to the art. Before an embodiment of the invention is explained in detail, it must be clear that the following details of construction, descriptions of geometry and illustrations of inventive concepts are mere examples of possible manifestations of the invention.

DETAILED DESCRIPTION OF PREFERRED EMBODIMENTS

Figure 1:
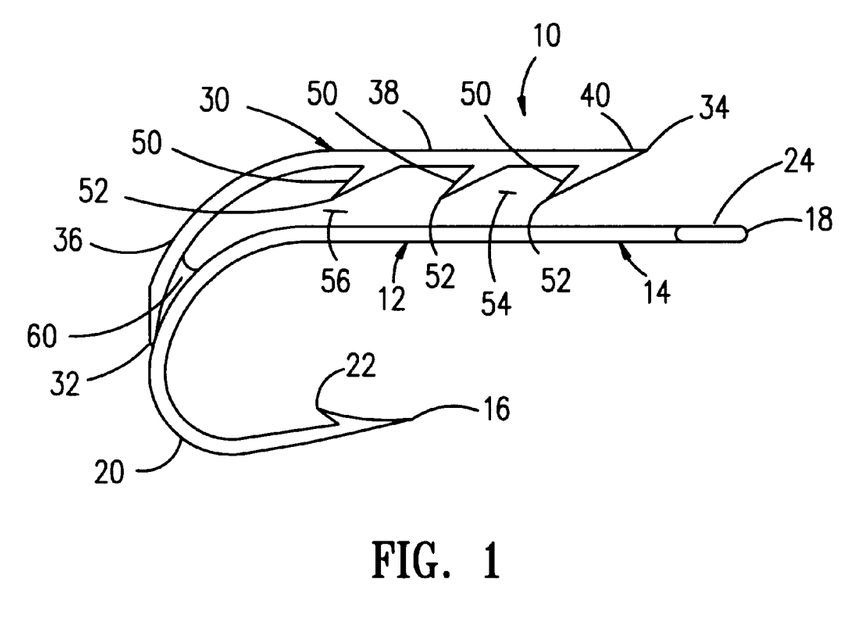
FIG. 1 is a view in side elevation of a preferred embodiment of the fish hook with bait holder where the bent portion of the rod is curved and is contiguous with the return bend of the shank of the fish hook.

Looking more particularly to the drawings, FIG. 1 depicts in side elevation a fish hook with bait holder fishing device, which is indicated generally at 10, according to a preferred embodiment of the present invention. Fishing device 10, essentially comprises a fish hook 12 and a rod 30 for receiving and holding a live bait fish 70 thereon without causing serious injury to, or impairing the natural swimming action of, the live bait fish 70, when in use.

More particularly, fishing device 10 has the fish hook 12 with a shank 14 having a return bend 20, a barb 22 at a first end 16 and an eye 24 for attaching a line 26 at a second end 18. The rod 30 has a bent portion 36 with a first end 32 and a linearly straight portion 38 with a second free end 34. The linearly straight portion of the rod 30 is disposed in longitudinally spaced relation from the shank 14. The bent portion 36 of rod 30 is attached to the shank 14 adjacent the first end 32 of the bent portion 36 of the rod 30 by a weld 60 or the like.

The rod 30 has first retainer means for receiving the live bait fish 70 disposed on the second 30 free end 34 of the rod 30. The first retainer means comprises a pointed portion 40 disposed on the second free end 34 of the linearly straight portion 38 of the rod 30; the pointed portion 40 being insertable under the skin into the tissue of the live bait fish 70 without causing serious injury to the live bait fish 70. The pointed portion 40 of the first retainer means, without departing from the intent and scope of this disclosure, may also alternately comprise a spear-like triangular head that may be tapered, a needle point, an arrow head or any pointed portion as long as it is sharp and can be easily insertable into the live bait fish 70.

The rod 30 has second retainer means for securing the live bait fish 70 to the rod 30 and to the shank 14 disposed on the linearly straight portion 38 of the rod 30. The second retainer means comprises at least three barbs 50 disposed on a surface of the linearly straight portion 38 facing the shank 14 of the fish hook 12 without extending onto the bent portion 36 of the rod 30 for engaging, securing and holding the live bait fish 70 to the shank 14. The at least three barbs 50 each having a tip 52; the tip 52 of the at least three barbs 50 each being oriented toward the bent portion 36 of the rod 30 away from the eye 24 of the shank 14 and the tip 52 of the at least three barbs 50 each being spaced away from the shank 14 of the fish hook 12.

Figure 5:
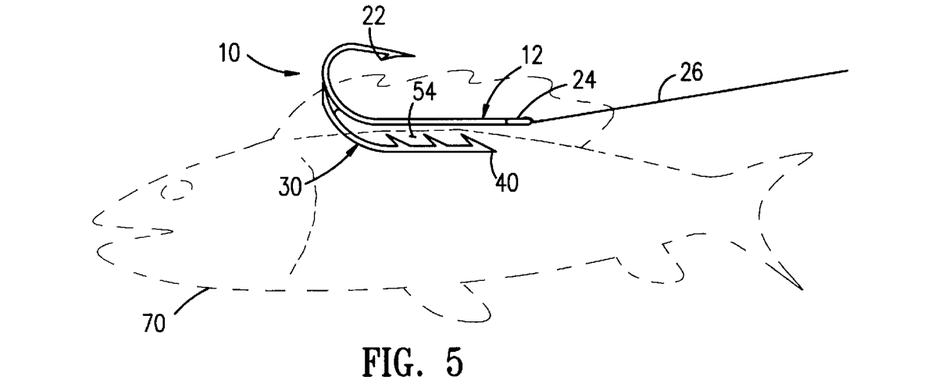
FIG. 5 is a view in side elevation of a preferred embodiment of the fish hook with bait holder of FIG. 1 and of FIG. 2, in use for still fishing, when mounted on a back portion of a live bait fish behind a dorsal fin.
Figure 6:
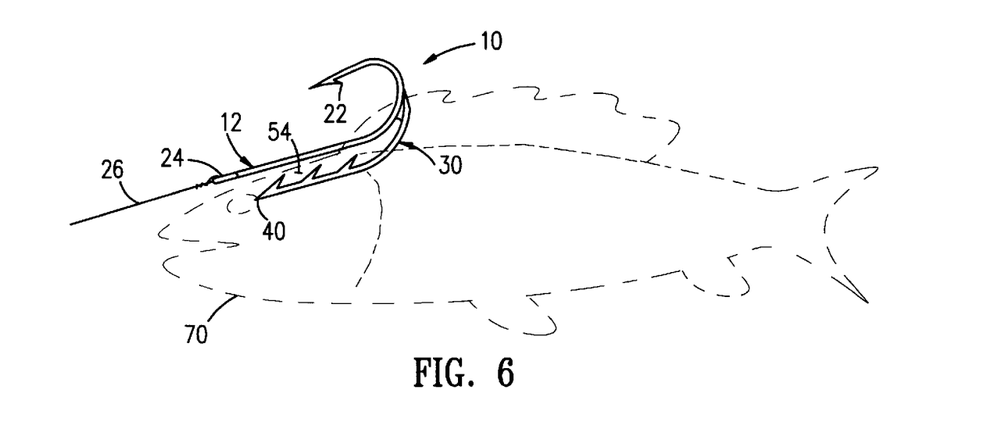
FIG. 6 is a view in side elevation of a preferred embodiment of the fish hook with bait holder of FIG. 1 and of FIG. 2, in use for trolling when mounted on a nose portion between the eyes of a live bait fish.
Figure 7:
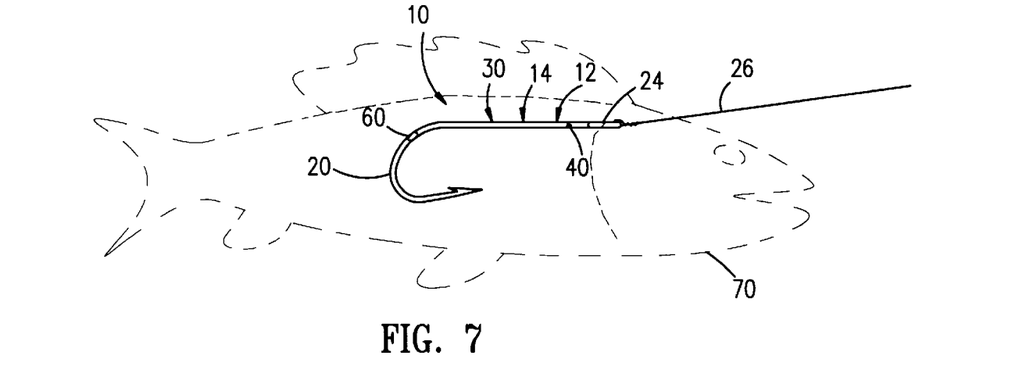
FIG. 7 is a view in side elevation of an alternative preferred embodiment of the fish hook with bait holder of FIG. 3 and of FIG. 4, in use when mounted on a body portion of a live bait fish when fishing according to the teaching of this invention.

The rod 30 cooperating with the shank 14 of the fish hook 12 to hold the live bait fish 70 therebetween as shown in FIG.5, in FIG. 6 and in FIG.7.

The linearly straight portion 38 of the rod 30 and the shank 14 define a gap 54 therebetween and each tip 52 of the at least three barbs 50 of the linearly straight portion 38 of the rod 30 and the shank 14 of the fish hook 12 define a space 56 therebetween sufficient enough for receiving the live bait fish 70 insertable thereon. Preferably, the gap 54 is at least 5/32 inch (0.40 cm) and the space 56 is at least 1/32 inch (0.08 cm). It is understood that the size of the gap 54, the space 56 and the length of each of the at least three barbs 50 would change to accommodate different sizes of the bait fish 70 for use on the particular size fish hook with bait holder 10 needed when fishing for various species of fish. Each of the at least three barbs 50, for holding the live bait fish 70, have a length being equivalent to the difference between the gap 54 and the space 56. For example, for the gap 54 of 5/32 inch (0.40 cm) and for the space 56 of 1/32 inch (0.08 cm), the length of each of the at least three barbs 50 extending from the rod 30 to the tip 52 of the at least three barbs 50, would be 1/8 inch (0.32 cm).

Although not necessary, preferably, the linearly straight portion 38 of the rod 30 being shorter than the shank 14 of the fish hook 12 such that the second free end 34 of the rod 30 extends toward the eye 24 formed in the shank 14 of the fish hook 12 terminating ahead of the eye 24 thereby leaving the eye 24 unimpeded by the linearly straight portion 38 of the rod 30 to allow the line 26 to be conveniently attachable to the eye 24 and to facilitate the live bait fish 70 being insertable on the rod 30.

Although not necessary, preferably, as shown in FIG. 1, the bent portion 36 is curved and contiguous with the return bend 20 of the fish hook 12 for ease of manufacture. This allows convenient mounting for receiving the live bait fish 70 on the fish hook with bait holder 10 by selectively inserting the pointed portion of the rod under the skin, into the tissue of the live bait fish 70, lengthwise along a dorsal fin, as shown in FIG. 5, when still fishing, or centrally, lengthwise between the eyes of the live bait fish 70 near a nose of the live bait fish 70, extending in a direction toward an upper mouth portion of the live bait fish 70 as shown in FIG. 6, when trolling, without causing serious injury to the live bait fish 70 or impairing the natural swimming action of the live bait fish 70, when in use.

Figure 2:
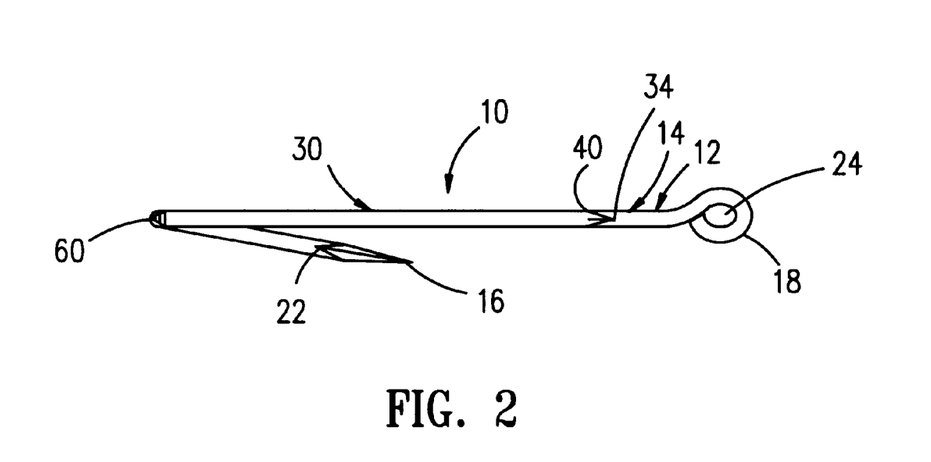
FIG. 2 is a top view of a preferred embodiment of the fish hook with bait holder of FIG. 1.
Figure 3:
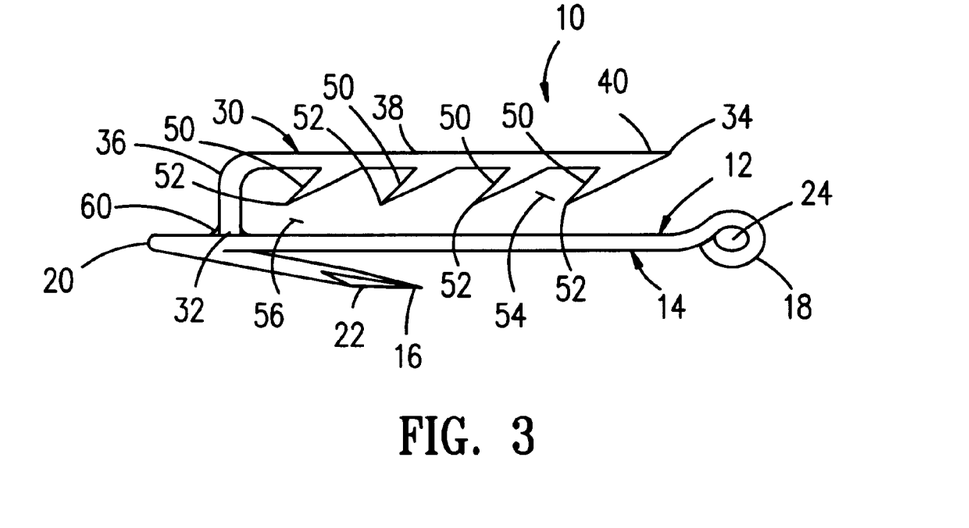
FIG. 3 is a view in side elevation of an alternative preferred embodiment of the fish hook with bait holder where the bent portion of the rod has a 90 degree bend and is disposed on the shank adjacent the return bend of the fish hook.

FIG. 2 is a top view of a preferred embodiment of the fish hook with bait holder 10. Alternately, the bent portion 36 of rod 30 of the fish hook with bait holder 10 may have an angular bend attachable to the shank 14 or to the return bend 20 of the fish hook 12 without departing from the disclosure of this invention. An alternative preferred embodiment of the fish hook with bait holder is shown in FIG. 3 and in FIG. 4 in a side elevation and in a top view respectively, where the bent portion 36 of the rod 30 has a 90 degree bend and is disposed on the shank 14 adjacent the return bend 20 of the fish hook 12.

Configuring the fishing device 10 as previously described, permits additional ways to mount the live bait fish 70 to the fishing device 10 as depicted in FIG. 5, in FIG. 6 and in FIG. 7.

As previously mentioned and as illustrated in FIG. 5, in FIG. 6 or in FIG. 7, it is understood that fishing device 10 may be provided and adapted to hold the live bait fish 70 appropriately, for the proper size of the live bait fish 70 needed for both fresh water and for salt water fishing depending upon the target fish sought. Furthermore, for example, the fish hook with bait holder 10 may be used for holding a minnow, a mackerel, a frog, insects, worms, cheese, meat, chum or even small mammals such as mice and other natural live and dead baits as well as artificial baits such as pork rind. This is accomplished by providing the fishing device 10 in a wide variety of hook sizes such as those ranging in size from smaller fresh water trout hooks, catfish hooks, bass hooks and pike hooks to larger hook sizes suitable for catching saltwater fish such as cod, striped bass, marlin and tuna.

To use the present invention, a user may mount the live bait fish 70 to the fish hook with live bait holder fishing device 10, as illustrated in FIG. 5, in FIG. 6 or in FIG. 7 by avoiding vital organs of the live bait fish 70.

FIG. 5 is a view in side elevation of a preferred embodiment of the fish hook with bait holder 10, in use for still fishing, when mounted on a back portion of the live bait fish 70 behind a dorsal fin. This is accomplished by inserting the pointed portion 40 of the first retainer means for receiving the live bait fish 70 under the skin, into the tissue, of the live bait fish 70, disposed in the gap 54, lengthwise along a dorsal fin without causing serious injury to the live bait fish 70. The pointed portion 40 positioning the live bait fish 70 so that the eye 24 of the fish hook 12 is oriented in a direction of a tail of the live bait fish 70, thereby concealing the barb 22 of the fish hook 12 behind the dorsal fin of the live bait fish 70; the barb 22 of the fish hook 12 being oriented toward the tail of the live bait fish 70 and thereby holding the live bait fish 70 on the fishing device 10 with the fish hook 12 being positioned and being ready to catch the target fish when the target fish strikes the live bait fish 70, head-first.

The fishing device 10 is also capable of catching the target fish when the target fish strikes the live bait fish 70 from any other position, but it is known that the target fish typically strike the live bait fish 70 head-first, when still fishing, or they deliberately orient the live bait fish 70 head-first prior to ingestion, hence, the fish hook 12 is positioned to advantageously capitalize on such feeding habits of the target fish. Concealing the fish hook 12 behind the dorsal fin of the live bait fish 70 is an advantage when seeking to catch wary target fish such as fresh water trout or other salt water target fish.

FIG. 6 is a view in side elevation of a preferred embodiment of the fish hook with bait holder 10 in use, for trolling, when mounted between the eyes on a nose portion of the live bait fish 70. This is accomplished by inserting the pointed portion 40 of the first retainer means for receiving the live bait fish 70 under the skin, into the tissue, of the live bait fish 70 disposed in the gap 54 centrally, lengthwise between the eyes of the live bait fish 70, near a nose of the bait fish 70 extending in a direction toward an upper mouth portion of the live bait fish 70, without causing serious injury to the live bait fish 70. The pointed portion 40 positioning the live bait fish 70 so that the eye 24 of the fish hook 12 is closest to the upper mouth of the live bait fish 70, thereby positioning the barb 22 of the fish hook 12 on the nose of the live bait fish 70 and thereby holding the live bait fish 70 on the fishing device 10 with the fish hook 12 being positioned and being ready to catch the target fish when the target fish strikes the live bait fish 70, tail-first.

Figure 4:
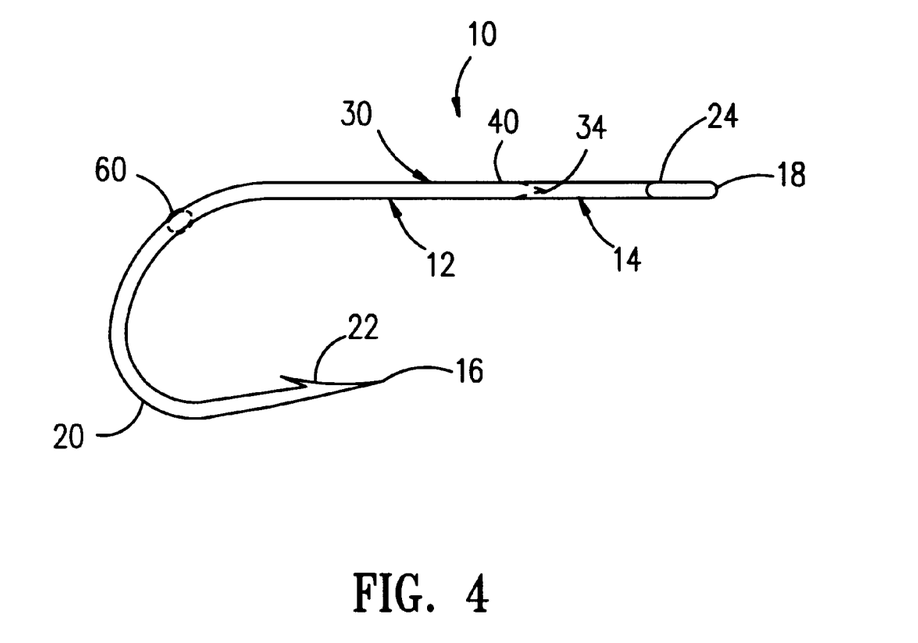
FIG. 4 is a top view of an alternative preferred embodiment of the fish hook with bait holder of FIG. 3.

FIG. 7 is a view in side elevation of an alternative preferred embodiment of the fish hook with bait holder 10 of FIG. 3 and of FIG. 4, in use when mounted on a body portion of the live bait fish 70, when fishing, according to the teaching of this invention. Configuring the fishing device 10 as previously described and as shown in FIG. 7, permits additional, convenient mounting for receiving the live bait fish 70 on the fish hook with bait holder 10 by selectively inserting the pointed portion 40 of the rod 30 under the skin, into the tissue, of the live bait fish 70, lengthwise, along the body portion without causing serious injury to the live bait fish 70 or impairing the natural swimming action of the live bait fish 70.

In addition to the mounting illustrated and discussed previously, a dead bait fish and other types of natural or artificial bait may be conveniently mounted to the fishing device 10.

The fish hook with bait holder 10 may be made preferably from metal such as rod, bar, wire or from flat stock. However, plastic or any other suitable material or stock in a variety of geometrical shapes such as round, square or rectangular may be used for construction. The fish hook with bait holder 10 may be constructed in a wide variety of sizes for use with various live bait fish when seeking particular target fish without departing from the scope of this disclosure. The fish hook 12 and rod 30 may be made by forming, bending, casting, machining, stamping, laser cutting, water jet cutting, molding or by other conventional fabrication techniques. Preferably, the rod 30 and the fish hook 12 may be separately made, for manufacturing ease. The rod 30 is attached to the shank 14 of the fish hook 12 with the weld 60 or by brazing, soldering or the like. Alternately, the fish hook 12 and the rod 30, of a preferred embodiment of the fish hook with bait holder 10, shown in FIG. 1 and in FIG. 2, may be constructed integrally, in one piece, such that the rod 30 is, automatically, by manufacture, attached integrally to the shank 14, during one of the following choosable methods of manufacture, without the need for separately fabricating or for separately attaching the rod 30 to the shank 14 with the weld 60 or the like. This can be accomplished by laser cutting, by water jet cutting, by casting, by molding, by stamping or the like in combination with necessary finishing operations.

Example

In accordance with the instant invention, the inventor made and experimentally tested prototypes for both fresh water and for salt water fishing with live bait fish with excellent results.

A prototype fish hook with bait holder 10, according to the teachings of a preferred embodiment of the invention shown in FIG. 1 and in FIG. 2, was constructed. However, the prototype fish hook with bait holder 10 was entirely constructed integral, in one piece, instead of from two pieces, from 16 gage steel stock by laser cutting and, therefore did not require that the rod 30 be welded, brazed, soldered or the like to the shank 14 of the fish hook 12. The eye 24 of the shank 14 was formed by bending the second end 18 of the shank 14 around a mandrel. The linearly straight portion 38 of the rod 30 being shorter than the shank 14 of the fish hook 12 such that the second free end 34 of the rod 30 extends toward the eye 24 formed in the shank 14 of the fish hook 12 terminating ahead of the eye 24 thereby leaving the eye 24 unimpeded by the linearly straight portion 38 of the rod 30 to allow the line 26 to be conveniently attachable to the eye 24 and to facilitate the live bait fish 70 being insertable on the rod 30.

The overall size of the prototype is approximately 2 1/4 inches long (5.72 cm) by 1 1/2 inches wide (3.81 cm).

The linearly straight portion 38 of the rod 30 and the shank 14 define a gap 54 of approximately 5/32 inch (0.40 cm) therebetween and each tip 52 of the at least three barbs 50 of the linearly straight portion 38 of the rod 30 and the shank 14 of the fish hook 12 define a space 56 of approximately 1/32 inch (0.08 cm) therebetween sufficient enough for receiving the live bait fish 70 insertable thereon. Each of the at least three barbs 50, for holding the live bait fish 70, have a length being equivalent to the difference between the gap 54 and the space 56. The length of each of the at least three barbs 50 extending from the rod 30 to the tip 52 of the at least three barbs 50 is approximately 1/8 inch (0.32 cm).

By inserting the pointed portion 40 of the prototype fish hook with bait holder 10 into the live bait fish 70 according to the teachings of this invention, it was found that the at least three barbs 50, securely held the live bait fish 70 on the fishing device 10. It was also discovered that the fish hook with bait holder 10 was easily and quickly mounted onto the live bait fish 70 even when the live bait fish 70 was actively jumping and moving when handled. The prototype fish hook and bait holder 10, did not seriously injure, nor did it impair the natural swimming action of the live bait fish 70 when in use. Other smaller size prototypes of a preferred embodiment of the invention were also fabricated in a similar manner from metal stock by laser cutting with similar positive results.

One practical advantage of the invention is that it provides an efficient, convenient, practical, low cost and versatile fishing device for a fish hook with bait holder 10 that receives and holds the live bait fish 70 without causing serious injury to or impairing the natural swimming action of the live bait fish 70. Also, the fishing device 10 is adaptable to being selectively mountable on various body locations of the live bait fish 70, as well as being usable with other types of natural and artificial baits. Furthermore, the fishing device 10 provides convenience, timesaving, fun and a potential for catching more fish and for providing more enjoyment of the sport of fishing. Of course, a wide variety of further uses and advantages of the present invention will become apparent to one skilled in the art.

Although the invention has been shown and described with reference to certain preferred embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

I claim:

1. A method for receiving and holding a live bait fish on a fish hook with bait holder comprising the steps:

providing a fish hook comprising:
a shank having a return bend, a barb at a first end, an eye for attaching a line at a second end;

providing a rod; said rod having a bent portion with a first end and a linearly straight portion with a second free end;

attaching said bent portion of said rod to said shank adjacent said first end of said bent portion of said rod;

disposing said linearly straight portion of said rod in longitudinally spaced relation from said shank;

providing first retainer means for receiving the live bait fish disposed on said second free end of said rod comprising a pointed portion disposed on said second free end of said linearly straight portion of said rod;

providing second retainer means for securing the live bait fish to said rod and to said shank disposed on said linearly straight portion of said rod comprising at least three barbs disposed on a surface of said linearly straight portion facing said shank of said fish hook without extending onto said bent portion of said rod for engaging and securing the live bait fish to said shank; said at least three barbs each having a tip; said tip of said at least three barbs each being oriented toward said bent portion of said rod away from said eye of said shank and said tip of said at least three barbs each being spaced away from said shank of said fish hook;

allowing said linearly straight portion of said rod and said shank define a gap therebetween of at least 5/32 inch (0.40 cm) and each said tip of said at least three barbs of said linearly straight portion of said rod and said shank of said fish hook define a space therebetween of at least 1/32 inch (0.08 cm) for receiving the live bait fish insertable thereon; each of said at least three barbs, for holding the live bait fish, having a length being equivalent to the difference between said gap and said space; said linearly straight portion of said rod being shorter than said shank of said fish hook such that said second free end of said rod extends toward said eye formed in said shank of said fish hook terminating ahead of said eye thereby leaving said eye unimpeded by said linearly straight portion of said rod to allow the line to be conveniently attachable to said eye and to facilitate the live bait fish being insertable on said rod;

said rod cooperating with said shank for holding the live bait fish therebetween;

providing a live bait fish;

inserting said first retainer means for receiving the live bait fish under the skin into the tissue of the live bait fish disposed in said gap without causing serious injury to the live bait fish; and engaging and securing the live bait fish to said shank using said second retainer means.

2. The method for receiving and holding a live bait fish on a fish hook with bait holder of claim 1 wherein said step of providing a rod having a bent portion with a first end and a linearly straight portion with a second free end, said bent portion of said rod is curved and is contiguous with said return bend of said shank of said fish hook and said bent portion of said rod is attached to said return bend of said shank at said first end of said rod with a weld.

3. The method for receiving and holding a live bait fish on a fish hook with bait holder of claim 1 wherein said step of providing a rod having a bent portion with a first end and a linearly straight portion with a second free end, said bent portion of said rod has a 90 degree bend and is attached to said shank at said first end of said rod adjacent said return bend with a weld.

4. The method for receiving and holding a live bait fish on a fish hook with bait holder of claim 2 wherein said steps of inserting said first retainer means for receiving the live bait fish under the skin into the tissue of the live bait fish disposed in said gap without causing serious injury to the live bait fish; and engaging and securing the live bait fish to said shank using said second retainer means:

further comprising the additional step of inserting said pointed portion of said first retainer means for receiving the live bait fish under the skin into the tissue of the live bait fish disposed in said gap lengthwise along a dorsal fin, when still fishing, without causing serious injury to the live bait fish; said pointed portion positioning the live bait fish so that said eye of said fish hook is oriented in a direction of a tail of the live bait fish, thereby concealing said barb of said fish hook is behind said dorsal fin of the live bait fish; said barb of said fish hook being oriented toward the tail of the live bait fish and thereby holding the live bait fish on said fish hook with said fish hook being positioned and being ready to catch a target fish when the target fish strikes the live bait fish head-first.

5. The method for receiving and holding a live bait fish on a fish hook with bait holder of claim 2 wherein said steps of inserting said first retainer means for receiving the live bait fish under the skin into the tissue of the live bait fish disposed in said gap without causing serious injury to the live bait fish; and engaging and securing the live bait fish to said shank using said second retainer means:

further comprising the additional step of inserting said pointed portion of said first retainer means for receiving the live bait fish under the skin into the tissue of the live bait fish disposed in said gap centrally lengthwise between the eyes of the live bait fish near a nose of the live bait fish extending in a direction toward an upper mouth portion of the live bait fish, when trolling, without causing serious injury to the live bait fish; said pointed portion positioning the live bait fish so that said eye of said fish hook is closest to the upper mouth of the live bait fish, thereby positioning said barb of said fish hook on the nose of the live bait fish and thereby holding the live bait fish on said fish hook with said fish hook being positioned and being ready to catch a target fish when the target fish strikes the live bait fish tail-first.

6. The method for receiving and holding a live bait fish on a fish hook with bait holder of claim 3 wherein said steps of inserting said first retainer means for receiving the live bait fish under the skin into the tissue of the live bait fish disposed in said gap without causing serious injury to the live bait fish; and engaging and securing the live bait fish to said shank using said second retainer means:

further comprising the additional step of inserting said pointed portion of said first retainer means for receiving the live bait fish under the skin into the tissue of the live bait fish disposed in said gap lengthwise along a body portion of the live bait fish, when fishing, without causing serious injury to the live bait fish; said pointed portion positioning the live bait fish with said barb of said fish hook being selectively oriented thereby holding the live bait fish on said fish hook with said fish hook being ready to catch a target fish when the target fish strikes the live bait fish.

7. A fish hook for receiving and holding a live bait fish, said fish hook comprising:

a shank having a return bend, a barb at a first end, an eye for attaching a line at a second end, a rod, said rod having a bent portion with a first end and a linearly straight portion with a second free end, said bent portion of said rod attached to said shank adjacent said first end of said bent portion of said rod;

said linearly straight portion of said rod disposed in longitudinally spaced relation from said shank;

first retainer means for receiving the live bait fish disposed on said second free end of said rod wherein said first retainer means comprising a pointed portion disposed on said second free end of said linearly straight portion of said rod; said pointed portion being insertable under the skin into the tissue of the live bait fish without causing serious injury to the live bait fish.

second retainer means for securing the live bait fish to said rod and to said shank disposed on said linearly straight portion of said rod wherein said second retainer means comprising at least three barbs disposed on a surface of said linearly straight portion facing said shank of said fish hook without extending onto said bent portion of said rod for engaging, securing and holding the live bait fish to said shank; said at least three barbs each having a tip; said tip of said at least three barbs each being oriented toward said bent portion of said rod away from said eye of said shank and said tip of said at least three barbs each being spaced away from said shank of said fish hook; and said rod cooperating with said shank to hold the live bait fish therebetween.

8. The fish hook of claim 7 wherein said linearly straight portion of said rod and said shank define a gap therebetween and each said tip of said at least three barbs of said linearly straight portion of said rod and said shank of said fish hook define a space therebetween sufficient enough for receiving the live bait fish insertable thereon; each of said at least three barbs, for holding the live bait fish, having a length being equivalent to the difference between said gap and said space.

9. The fish hook of claim 8 wherein said linearly straight portion of said rod being shorter than said shank of said fish hook such that said second free end of said rod extends toward said eye formed in said shank of said fish hook terminating ahead of said eye thereby leaving said eye unimpeded by said linearly straight portion of said rod to allow the line to be conveniently attachable to said eye and to facilitate the live bait fish being insertable on said rod.

10. The fish hook of claim 9 wherein said bent portion of said rod is curved and is contiguous with said return bend of said shank of said fish hook and said bent portion of said rod is attached to said return bend of said shank at said first end of said rod with a weld.

11. The fish hook of claim 9 wherein said bent portion of said rod has a 90 degree bend and is attached to said shank at said first end of said rod adjacent said return bend with a weld.

12. A fish hook for receiving and holding a live bait fish, said fish hook comprising:

a shank having a return bend, a barb at a first end, an eye for attaching a line at a second end;

a rod;

said rod having a bent portion with a first end and a linearly straight portion with a second free end;

said bent portion of said rod attached to said shank adjacent said first end of said bent portion of said rod;

said linearly straight portion of said rod disposed in longitudinally spaced relation from said shank;

first retainer means for receiving the live bait fish disposed on said second free end of said rod comprising a pointed portion disposed on said second free end of said linearly straight portion of said rod; said pointed portion being insertable under the skin into the tissue of the live bait fish without causing serious injury to the live bait fish;

second retainer means for securing the live bait fish to said rod and to said shank disposed on said linearly straight portion of said rod comprising at least three barbs disposed on a surface of said linearly straight portion facing said shank of said fish hook without extending onto said bent portion of said rod for engaging and securing the live bait fish to said shank; said at least three barbs each having a tip; said tip of said at least three barbs each being oriented toward said bent portion of said rod away from said eye of said shank and said tip of said at least three barbs each being spaced away from said shank of said fish hook;

said linearly straight portion of said rod and said shank define a gap therebetween and each said tip of said at least three barbs of said linearly straight portion of said rod and said shank of said fish hook define a space therebetween sufficient enough for receiving the live bait fish insertable thereon; each of said at least three barbs, for holding the live bait fish, having a length being equivalent to the difference between said gap and said space; and said rod cooperating with said shank to hold the live bait fish therebetween.

13. The fish hook of claim 12 wherein said linearly straight portion of said rod being shorter than said shank of said fish hook such that said second free end of said rod extends toward said eye formed in said shank of said fish hook terminating ahead of said eye thereby leaving said eye unimpeded by said linearly straight portion of said rod to allow the line to be conveniently attachable to said eye and to facilitate the live bait fish being insertable on said rod.

14. The fish hook of claim 12 wherein said linearly straight portion of said rod and said shank define said gap therebetween of at least 5/32 inch (0.40 cm) and each said tip of said at least three barbs of said linearly straight portion of said rod and said shank of said fish hook define a space therebetween of at least 1/32 inch (0.08 cm) for receiving the live bait fish insertable thereon.

15. The fish hook of claim 12 wherein said linearly straight portion of said rod and said shank define a gap therebetween of at least 5/32 inch (0.40 cm) and each said tip of said at least three barbs of said linearly straight portion of said rod and said shank of said fish hook define a space therebetween of at least 1/32 inch (0.08 cm) for receiving the live bait fish insertable thereon; said linearly straight portion of said rod being shorter than said shank of said fish hook such that said second free end of said rod extends toward said eye formed in said shank of said fish hook terminating ahead of said eye thereby leaving said eye unimpeded by said linearly straight portion of said rod to allow the line to be conveniently attachable to said eye and to facilitate the live bait fish being insertable on said rod.

16. A fish hook for receiving and holding a live bait fish, said fish hook comprising:

a shank having a return bend, a barb at a first end, an eye for attaching a line at a second end;

a rod having a bent portion with a first end and a linearly straight portion with a second free end;

said bent portion of said rod attached to said shank adjacent said first end of said bent portion of said rod;

said linearly straight portion of said rod disposed in longitudinally spaced relation from said shank;

first retainer means for receiving the live bait fish disposed on said second flee end of said rod comprising a pointed portion disposed on said second free end of said linearly straight portion of said rod; said pointed portion being insertable under the skin into the tissue of the live bait fish without causing serious injury to the live bait fish;

second retainer means for securing the live bait fish to said rod and to said shank disposed on said linearly straight portion of said rod comprising at least three barbs disposed on a surface of said linearly straight portion facing said shank of said fish hook without extending onto said bent portion of said rod for engaging and securing the live bait fish to said shank; said at least three barbs each having a tip; said tip of said at least three barbs each being oriented toward said bent portion of said rod away from said eye of said shank and said tip of said at least three barbs each being spaced away from said shank of said fish hook;

said linearly straight portion of said rod and said shank define a gap therebetween of at least 5/32 inch (0.40 cm) and each said tip of said at least three barbs of said linearly straight portion of said rod and said shank of said fish hook define a space therebetween of at least 1/32 inch (0.08 cm) for receiving the live bait fish insertable thereon; each of said at least three barbs, for holding the live bait fish, having a length being equivalent to the difference between said gap and said space; said linearly straight portion of said rod being shorter than said shank of said fish hook such that said second free end of said rod extends toward said eye formed in said shank of said fish hook terminating ahead of said eye thereby leaving said eye unimpeded by said linearly straight portion of said rod to allow the line to be conveniently attachable to said eye and to facilitate the live bait fish being insertable on said rod; and said rod cooperating with said shank to hold the live bait fish therebetween.

17. The fish hook of claim 16 wherein said bent portion of said rod is curved and is contiguous with said return bend of said shank of said fish hook and said bent portion of said rod is attached to said return bend of said shank at said first end of said rod with a weld.

18. The fish hook of claim 16 wherein said bent portion of said rod has a 90 degree bend and is attached to said shank at said first end of said rod adjacent said return bend with a weld.

* * * * *